April 3, 1956          J. F. WRIGHT          2,740,440

DATE PITTER HAVING STEAM INJECTING MEANS

Filed Aug. 24, 1951          3 Sheets-Sheet 1

JAMES F. WRIGHT
INVENTOR.

BY Lyon & Lyon
ATTORNEYS.

April 3, 1956  J. F. WRIGHT  2,740,440
DATE PITTER HAVING STEAM INJECTING MEANS
Filed Aug. 24, 1951  3 Sheets-Sheet 3

JAMES F. WRIGHT
INVENTOR.

BY Lyon & Lyon
ATTORNEYS.

United States Patent Office 2,740,440
Patented Apr. 3, 1956

2,740,440

DATE PITTER HAVING STEAM INJECTING MEANS

James F. Wright, Indio, Calif.

Application August 24, 1951, Serial No. 243,441

2 Claims. (Cl. 146—17)

This invention relates to a method and apparatus for removing the pit or stone from a fruit and is particularly directed to a method and apparatus for removing the elongated pit axially from a date.

Commercial forms of date pitting apparatus now in use remove the pit sidewise from the date with considerable loss and waste of the flesh of the date. Since the ends of the elongated pit of a date are pointed, I have found that it is possible to eject the pit axially with a minimum loss of flesh of the date, the pointed end of the pit serving to spread apart the date flesh as the pit is moved endwise, without forcing any substantial amount of the flesh of the date ahead of the pit. Furthermore, a date pitted axially has better appearance and commands a higher market price than one pitted by conventional methods.

Among the objects of my invention is to provide a method and apparatus employing an ejector rod having a socketed tip for engaging the pointed end of the elongated pit within a date and for ejecting the pit axially from the date.

Another object is to provide a method and apparatus for removing the pit from a date, which method and apparatus may advantageously be employed on dry dates and before hydration thereof.

Another object is to provide means for centering the pit of the date and for holding the date against axial movement while the ejector rod is operating to remove the pit.

Another object is to provide a method and apparatus for injecting steam into the interior of the date while the pit is being removed and while the ejector rod is being retracted from the interior of the date, the steam serving to minimize sticking of the date on the ejector rod, and further to serve a beneficial purpose in hydrating the date.

In accordance with my invention I provide a pair of axially aligned relatively movable members having opposed tapered sockets. The date is confined endwise between the members by engagement of the ends of the date with the tapered sockets. The pit within the date is automatically oriented by such engagement so that its longitudinal axis is positioned substantially on the axis of the socketed members. An ejector rod is thrust axially through one of the members and into the date. The tip end of the ejector rod is provided with a socket which "finds" the pointed end of the pit and then moves the pit axially through the body of the date and ejects it. The rod is then retracted axially out of the interior of the date and the socketed members are separated so that the pitted date may be removed. The operations may be conducted by hand using a pair of socketed members and an ejector rod having a socketed tip. I prefer, however, to perform the pitting operation by means of mechanically driven apparatus requiring a minimum of manual labor.

Figure 1:
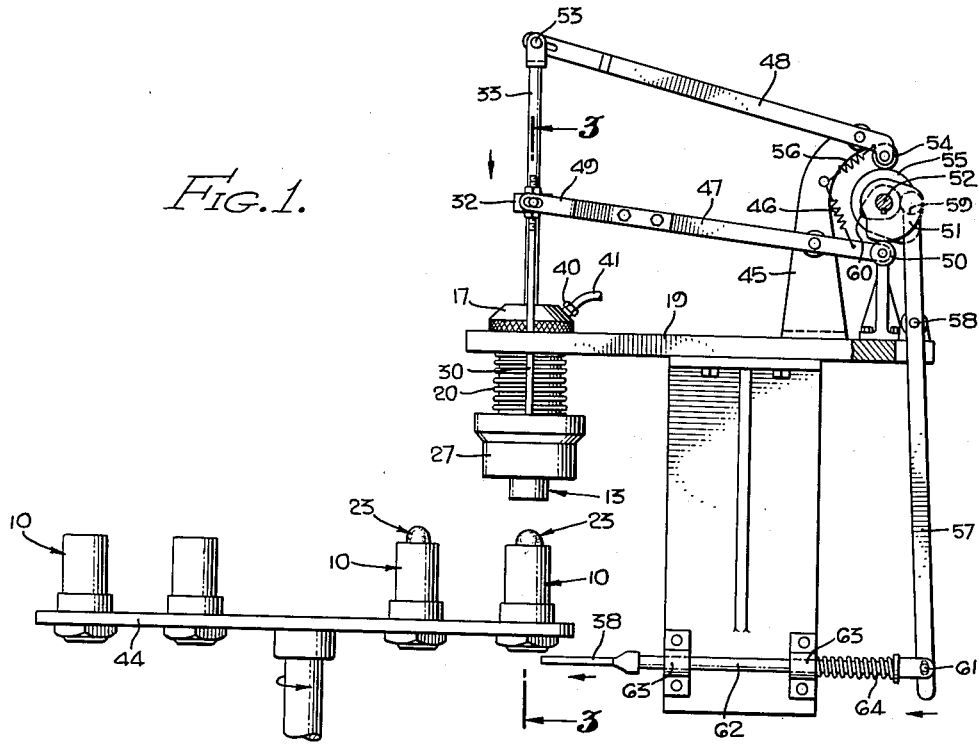
Figure 1 is a side elevation showing a general assembly of a preferred embodiment of my invention.
Figure 2:
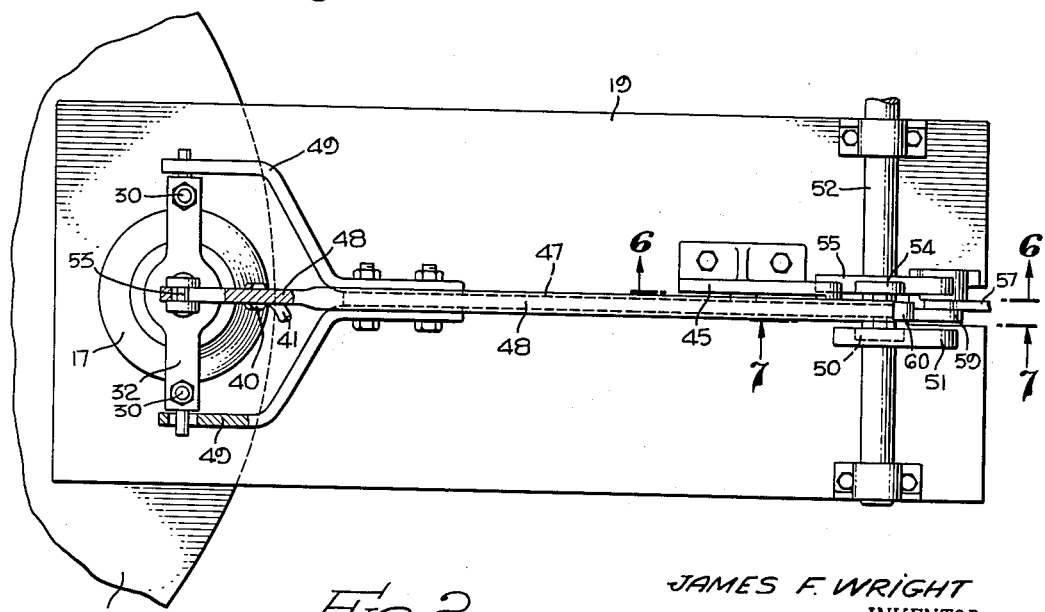
Figure 2 is an enlarged plan view of a portion thereof.
Figure 3:
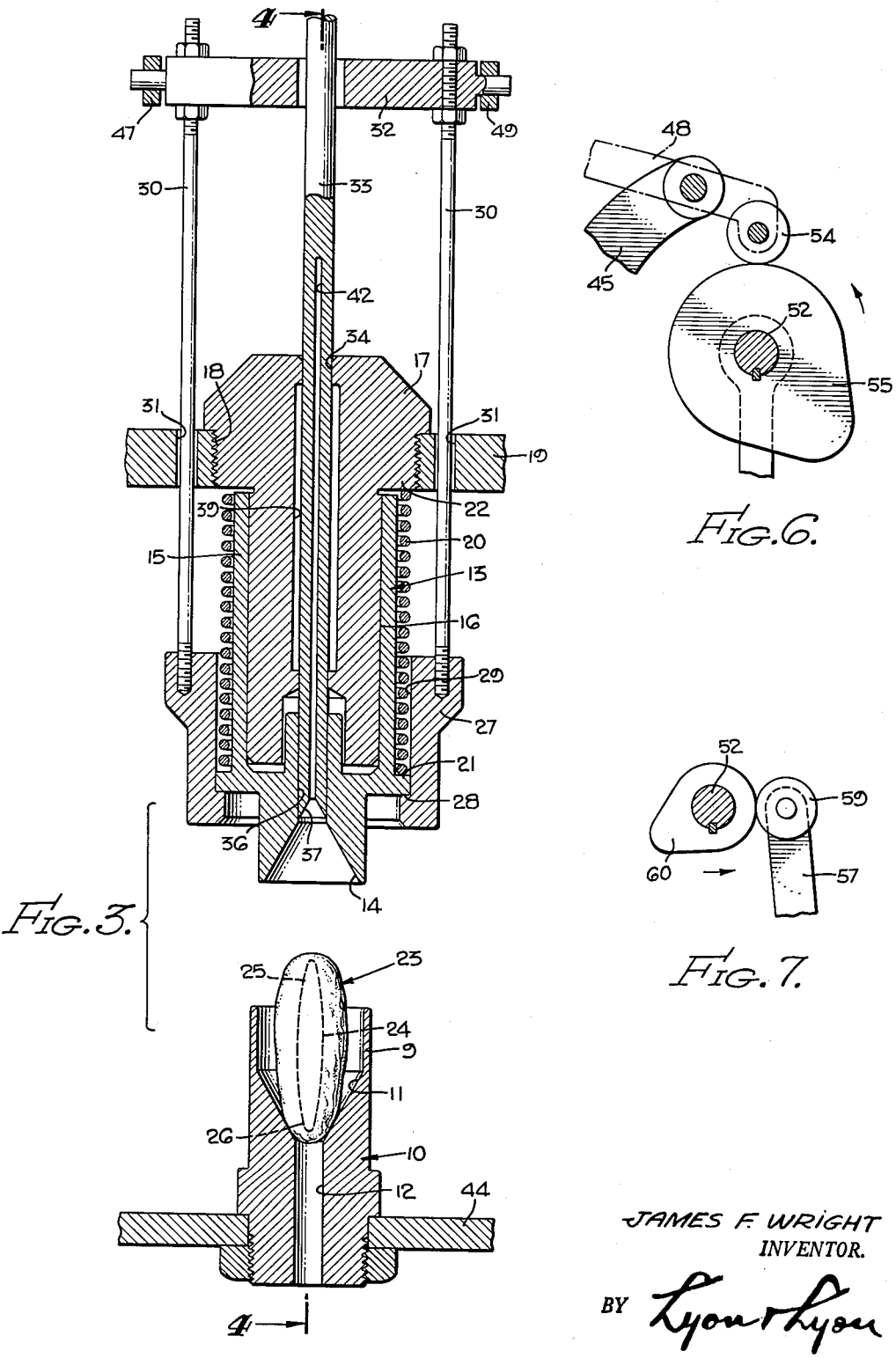
Figure 3 is an enlarged longitudinal sectional view taken substantially on the line 3—3 as shown in Figure 1.
Figure 4:
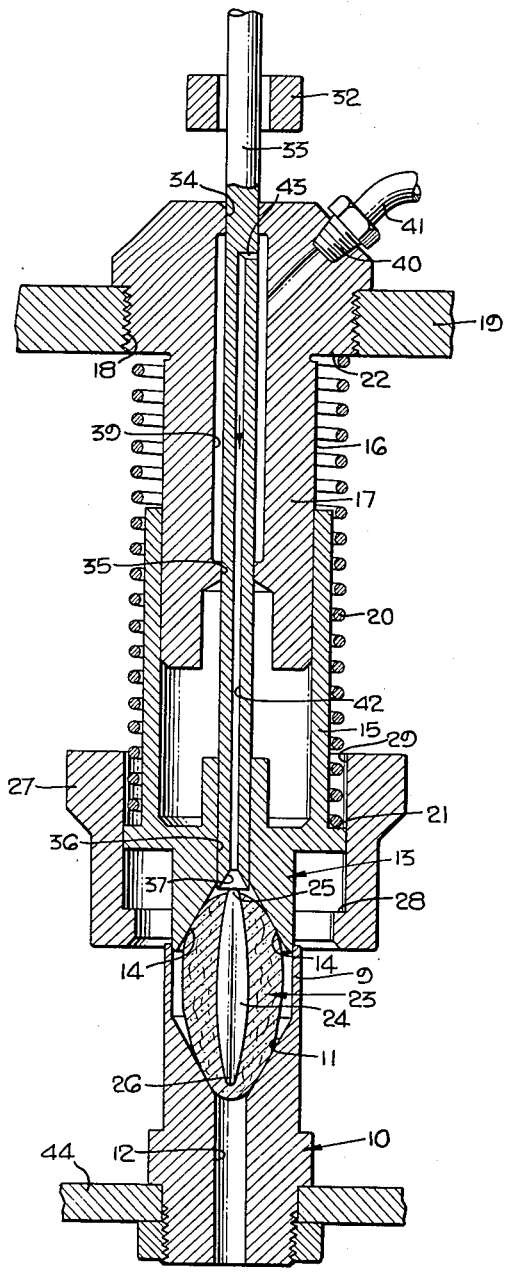
Figure 4 is a sectional elevation taken substantially on the line 4—4 as shown in Figure 3 and showing the socket members in position to confine a date endwise therebetween.

Figures 6 and 7 are enlarged sectional views taken substantially on the lines 6—6 and 7—7 as shown in Figure 2.

Referring to the drawings, a stationary member 10 is provided with an upwardly facing tapered socket 11 and a central axial bore 12. A movable member 13 is positioned above the stationary member 10 in axial alignment therewith and is provided with a downwardly facing tapered socket 14. The movable member 13 is provided with an integral shell 15 which is slidably mounted on the cylindrical outer surface 16 of the stationary guide bushing 17. The guide bushing 17 may be supported in any convenient manner, and as shown in the drawings is provided with threads 18 for connection to the stationary base plate 19.

Resilient means are provided for moving the member 13 downward relative to the guide bushing 17, and as shown in the drawings this means includes a compression spring 20 having its lower end resting on a rim 21 provided on the member 13 and its upper end engaging an abutment 22 provided on the stationary guide bushing 17. The spring 20 acts resiliently to move the member 13 downward in order to confine a date 23 endwise between the sockets 11 and 14. The date 23 has the usual elongated pit 24 with pointed ends 25 and 26. The action of the socket 14 is to center the upper end of the pit 24 within the socket by distorting the upper end of the flesh of the date 23. The tapered sockets 11 and 14 may take the shape of frusto-conical surfaces. A cylindrical rim 9 may be provided on the member 10 which extends upward from the tapered socket 11 and which serves to prevent excessive tilting of the date 23 before the movable member 13 is lowered. The spring 20 is light and exerts a relatively small force. Furthermore, the length of the spring is long enough so that substantially the same force is exerted endwise on the date 23 regardless of normal variation in the lengths of individual dates.

Means are provided for retracting the member 13 upwardly against the action of the spring 20, and as shown in the drawings this means includes the return collar 27 which encircles a portion of the member 13 and which is provided with a lip 28 underlying the rim 21 on the member 13. The internal bore 29 in the return collar is sufficiently large to slide freely over the outer circumference of the rim 21. Parallel tension rods 30 are threaded into the return collar at diametrically opposed locations, and these rods extend upward through suitable apertures 31 provided in the base plate 19. The tension rods 30 may be connected at their upper ends to a transverse crosshead 32.

An ejector rod 33 is guided within axially spaced cylindrical bores 34 and 35 provided within the stationary guide bushing 17. The rod 33 is also slidably received within the axial bore 36 within the movable member 13. The lower end of the ejector rod 33 is provided with a conical socket 37, and this socket is shaped to fit over the upper pointed end 25 of the pit 24 within the date 23.

Figure 5:
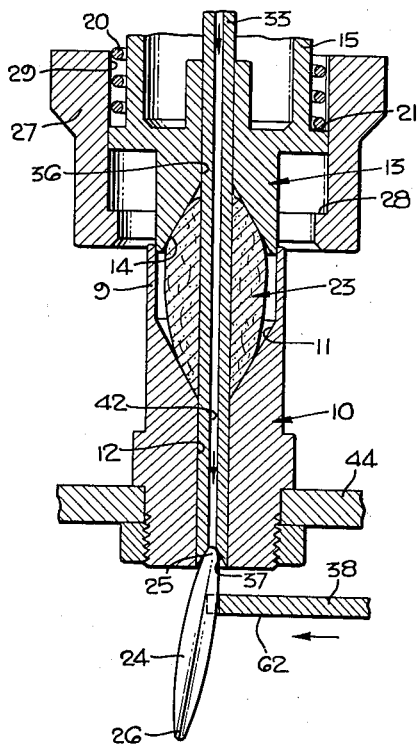
Figure 5 is a sectional view similar to Figure 4 and showing the elongated pit of the date being ejected from the lower end of the stationary socket member.

In operation, a date 23 is placed either end up within the upwardly facing socket 11 in the stationary member 10. The tension rods 30 are lowered to permit the spring 20 to move the member 13 downward so that the tapered socket 14 engages the upper end of the date and centers the pit within the socket. It is not necessary that the pit be symmetrically positioned within the date nor that its longitudinal axis and that of the date coincide. With the date 23 thus confined endwise between the sockets 11 and 14 and the upper end of the pit centered in the socket 14, the ejector rod 13 is moved downward to penetrate the flesh at the upper end of the date and to cause the lower socketed end 37 of the rod to engage over the upper pointed end of the date pit 24. Continued downward movement of the ejector rod 33 ejects the pit 24 axially through the central bore 12 in the stationary member 17. The lower pointed end 26 of the pit separates the flesh at the lower end of the date without carrying any considerable portion thereof downward ahead of the pit 24. When the ejector rod 33 reaches the lower end of its travel as shown in Figure 5, a kicker bar 38 moves laterally to engage the pit 24 and move it away from the lower end of the ejector rod 33. If the kicker bar 38 were not employed the pit 24 might stick to the lower end of the rod 33 and be drawn back upward through the bore 12 when the rod 33 is retracted. As the rod 33 is retracted and approaches its uppermost position the movable member 13 is also retracted upwardly by means of the return collar 27 and tension rods 30. The pitted date 23 may then be withdrawn from the socket 11.

An advantage of the method and apparatus described is that dates may be pitted before hydrating. The flesh of the date at this time is relatively dry and hard as compared to its moist and soft condition after hydrating. The hydrating process is expedited when the dates are pitted beforehand because of the additional area available within the interior of the date for surface contact by the hydrating medium. Moreover, the dry dates prior to hydration are not as sticky as they are after hydration, and therefore less difficulty is encountered in the operation of the pitting apparatus by formation of sugars, gums and sticky residue from the flesh of the dates.

The objectionable sticky residues which accumulate after a period of operation on dry dates may be minimized by introducing steam into the sliding parts of the apparatus. For this purpose a steam chamber 39 may be provided within the guide bushing 17 intermediate the cylindrical surfaces 34, and this chamber may be supplied with steam through fitting 40 and steam line 41. The steam tends to keep the cylindrical surfaces 34 and 35 free of accumulations of sticky residue and also the leakage of steam performs the same action within the bore 36 and along the outer cylindrical surface 16 of the guide bushings 17. The ejector rod 33 may be provided with an axial passageway 42 having its lower end communicating with the socket 37 and its upper end communicating with a lateral port 43. When the ejector rod 33 moves downward the port 43 communicates with the steam chamber 39 and steam passes through the axial passageway 42 and into the socket 37. Steam is thus injected into the interior of the date 23 during the action of ejecting the pit 25 axially therefrom. Steam from the socket 37 thus performs a certain amount of hydrating action within the interior of the date, and furthermore serves to prevent accumulations of sticky residue within the central bore 12 in the stationary member 10. When the ejector rod 33 is being retracted in an upward direction, steam is again introduced into the interior of the date 23.

The stationary member 10 may constitute one of a series of similar members mounted upon a rotary carrier or table 44. Indexing means may be provided for turning the table to bring each of the members 10 in sequence into a position of alignment with the axis of the movable member 13. The table 44 may be supported for rotation in any convenient manner.

The stationary base plate 19 carries a fulcrum support 45. Levers 47 and 48 are pivotally mounted on the support 45. The lever 47 is provided with a yoke 49 at one end which is pivotally connected to the crosshead 32. A follower roller 50 on the other end of the lever 47 engages a cam 51 fixed on the cam shaft 52. The lever 48 is pivotally connected by means of pin 53 to the upper end of the ejector rod 33. The other end of the lever 48 carries a follower roller 54 which contacts a cam 55. The cam 55 is also fixed on the cam shaft 52. A spring 56 maintains the roller 54 in contact with the cam 55. Spring 46 maintains roller 50 in contact with cam 51. From this description it will be understood that rotation of the cam shaft 52 serves to raise and lower the ejector rod 33 and the tension rods 30 in timed sequence. The cam shaft 52 may be rotatably supported and driven in any convenient manner. It is desirable to interconnect the drive means for the table 44 and for the cam shaft 52 so that they operate in timed relationship, although this feature is not essential to my invention. When the parts are operated in timed relationship and when the members 10 on the table are loaded mechanically a minimum of manual effort is required to operate the machine.

The kicker bar 38 may also be operated from the cam shaft 52. As shown in the drawings, the lever 57 may be pivotally mounted at 58 and may be provided with a follower roller 59 which engages cam 60 fixed on the shaft 52. The lower end of the lever 57 is connected by pin 61 to reciprocate the rod 62 within its supporting bearings 63. The kicker bar 38 is carried on the forward end of the rod 62. A spring 64 may be provided to retract the rod and kicker bar.

Having fully described my invention, it is to be understood that I do not wish to be limited to the details herein set forth, but my invention is of the full scope of the appended claims.

I claim:

1. In a device for ejecting a pit from a date, the combination of: means for holding the date, a hollow ejector rod provided with a socketed point, means for thrusting the hollow rod axially into the date so that one end of the elongated pit therein is engaged by the socketed point, means for introducing steam into the interior of the date through the hollow rod, the movement of the rod acting to expel the pit axially from the date while simultaneously ejecting steam into the interior of the date.

2. In a device for ejecting a pit from a date, the combination of: means for holding the date, a guide bushing having a steam chamber, a hollow ejector rod slidably mounted within the guide bushing and provided with a socketed point, the rod having an axial passageway communicating with the socketed point, the rod also having a lateral port axially spaced from said socketed point and communicating with said passageway, means for thrusting the hollow rod axially into the date so that one end of the elongated pit therein is engaged by the socketed point and so that the port communicates with the steam chamber, the movement of the rod acting to expel the pit axially from the date while simultaneously ejecting steam in the interior of the date.

References Cited in the file of this patent

UNITED STATES PATENTS

| Number | Name | Date |
| --- | --- | --- |
| 330,839 | Knapp | Nov. 17, 1885 |
| 686,875 | Wolff | Nov. 19, 1901 |
| 1,282,402 | Fenn | Oct. 22, 1918 |
| 1,438,526 | Herbert | Dec. 12, 1922 |
| 1,823,476 | Smith | Sept. 15, 1931 |
| 2,128,919 | Doyle | Sept. 6, 1938 |
| 2,485,653 | Peel | Oct. 25, 1949 |
| 2,591,213 | Stupin et al. | Apr. 1, 1952 |
| 2,612,197 | Giordano | Sept. 30, 1952 |